Sept. 10, 1957 T. H. WALKER 2,806,153

ELECTRIC TRIGGER CIRCUITS

Filed Dec. 15, 1953

Inventor
THOMAS H. WALKER
By [signature]
Attorney

1

2,806,153

ELECTRIC TRIGGER CIRCUITS

Thomas Harold Walker, London, England, assignor to International Standard Electric Corporation, New York, N. Y., a corporation of Delaware Application December 15, 1953, Serial No. 398,383

Claims priority, application Great Britain December 24, 1952

2 Claims. (Cl. 307—88.5)

The present invention relates to electric trigger circuits employing crystal triodes.

Various two-condition trigger circuits have been already proposed in which a pair of crystal triodes are arranged and inter-connected analogously to a pair of thermionic valves forming a multivibrator or flip-flop circuit. However, on account of the fact that the properties of crystal triodes and valves are not identical the circuits have to be differently arranged when crystal triodes are used.

The specification of copending application Serial No. 383,615, filed October 1, 1953, discloses some crystal triode two-condition circuits in all of which the feedback coupling between the two crystal triodes is between like electrodes. The present invention offers a different solution of the problem, and the chief object is to provide reliable operation of such circuits without requiring too high a standard of performance for the crystal triodes, and to ensure that the performance requirements are easily specified.

In some trigger circuits already proposed, there is a danger that excessive currents may be produced, sufficient to damage the crystal triodes. Another object of the invention, therefore, is to provide circuits in which the crystal triodes are used under well defined and safe working conditions.

These objects are achieved according to the invention by providing an electric trigger circuit comprising a pair of similar crystal triodes coupled together to form a two-condition circuit, an electrode of one kind of each crystal triode being connected to an electrode of a different kind of the other, the arrangements being such that the crystal triodes must always be in respectively opposite current conducting states, means for applying an electric pulse to the circuit to switch it from one condition to the other and means for deriving from the circuit an output pulse or signal in response to the change in condition of the circuit.

Figure 1:
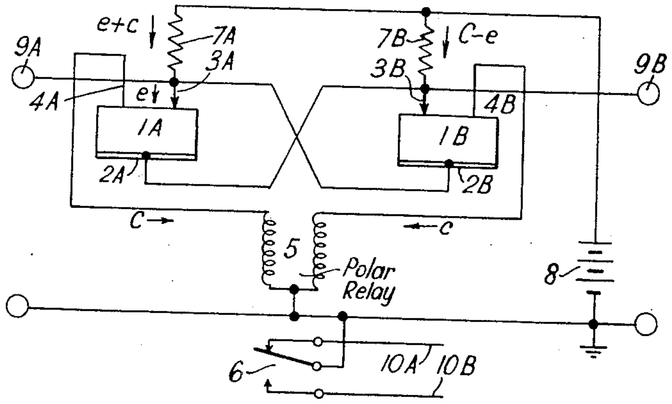
Figure 2:
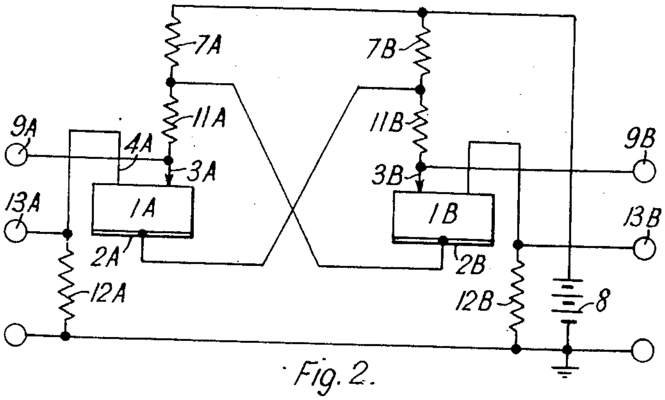

The invention will be described with reference to the accompanying drawing, in which Figs. 1 and 2 show schematic circuit diagrams of two embodiments of the invention.

Referring to the embodiment of Fig. 1 two similar crystal triodes 1A and 1B are shown having respectively base electrodes 2A and 2B, input or emitter electrodes 3A and 3B and output or collector electrodes 4A and 4B. It will be assumed for clearness that the crystal triodes are of the kind which require the emitter and collector electrodes to be polarised respectively positively and negatively with respect to the base electrode, in order to operate as amplifiers.

The collector electrodes 4A and 4B are connected to ground respectively through two windings of a polarised relay 5 having a set of changeover contacts 6 for indicating the condition of the trigger circuit.

The emitter electrodes 3A and 3B are respectively connected directly to the base electrodes 2B and 2A and are also connected through corresponding equal feed resistors 7A and 7B to a grounded positive polarising source 8.

2

This arrangement is such that if one of the crystal triodes is in the "on" or amplifying state (that is, the emitter electrode is positive to the base electrode, so that the emitter current is therefore switched on) the other crystal triode must be in the "off" or non-amplifying state (that is, the emitter electrode is negative to the base electrode, so that the emitter current is switched off). Let it be assumed that crystal triode 1B is off. Then in this crystal triode there is no emitter current and a small collector current $c$, while in crystal triode 1A, which is "on" there is an emitter current $e$ and a large collector current C. If R is the resistance of each feed resistor 7A and 7B, the potential drop $E_a$ across resistor 7A will be $(e+c)R$ while the potential drop $E_b$ across resistor 7B will be $(C-e)R$. In order that crystal triode 1A should be "on," it is necessary that $E_b$ should be greater than $E_a$, and it can be shown that this will be so if $C/e$ is greater than $2+c/e$. Usually $C/e$ is approximately equal to the current gain $\alpha$, and if the current $c$ which flows when the crystal triode is in the "off" condition is small compared with $e$, then the above condition is approximately equivalent to $\alpha$ greater than 2 for each crystal triode. Thus if crystal triode 1A is "on," the difference of potential between the emitter electrode 3A and the base electrode 2A will be $(E_a-E_b)$. From the description of the circuit given above it can be seen that the difference of potential between the emitter electrode 3B and the base electrode 2B of crystal triode 1B must be $(E_b-E_a)$, which is negative, so crystal triode 1B will be in the "off" state.

The circuit can be switched to the opposite condition with crystal triode 1A "off" and crystal triode 1B "on" by applying a negative pulse to a terminal 9A connected to the emitter electrode 3A of crystal triode 1A, or a positive pulse to a terminal 9B connected to the emitter electrode 3B of crystal triode 1B. It may be switched alternately between the two conditions by applying alternately positive and negative pulses to either terminal.

When the crystal triode 1B is "off," the collector current C from crystal tiode 1A through the left-hand winding of the relay 5 is greater than the collector current $c$ from crystal triode 1B through the right-hand winding. This operates the movable contact of the relay to the upper fixed contact, thereby connecting ground to a first output conductor 10A. When the circuit is triggered over to the opposite condition with the crystal triode 1A "off," the currents C and $c$ will be interchanged, and the movable contact of the relay 5 will be moved to the lower fixed contact, thereby transferring the ground connection to another output conductor 10B. The conductors 10A and 10B may be connected to any desired indicator or other device to be operated in response to the triggering of the circuit. Clearly the relay 5 may be provided with any convenient contact arrangement, that shown being only an example.

Fig. 2 shows a slightly improved form of Fig. 1, in which an alternative method is shown for obtaining an output in response to the triggering of the circuit. Additional resistors 11A and 11B are included in series respectively with the resistors 7A and 7B, and the base electrodes 2A and 2B are connected respectively to the junction points of elements 7B, 11B and 7A, 11A. When the crystal triode 1B is "off," the addiitonal potential drop of the emitter current of crystal triode 1A in the resistor 11A increases the difference of potential between the emitter and base electrodes 3B and 2B of the crystal triode 1B, which, as already explained, is negative. In the case of the crystal triode 1A, which is "on," the corresponding positive difference of potential is increased in like manner. The change in emitter potential which occurs when the circuit is switched over is thus increased by the presence of the resistors 11A and 11B.

According to another minor modification of the circuit, two resistors 12A and 12B (which need not be equal) are included respectively in series with the connections between the collector electrodes 4A and 4B and ground, the relay 5 being in this case omitted. The chief effect is to increase the potential between the base electrode and ground when the corresponding crystal triode is "off," thus increasing the value of the collector current in the "off" state.

In this last-mentioned arrangement, output terminals 13A and 13B are respectively connected to the collector electrodes 4A and 4B, and output pulses may be derived from either terminal in response to the application of pulses to terminal 9A or 9B for triggering the circuit between the two conditions. If desired, however, the windings of the relay 5 (Fig. 1) could be connected respectively in series with the resistors 12A and 12B, the contacts being arranged as described with reference to Fig. 1 or in any other convenient way.

The circuit arrangement which has been described is very simple and involves few components. Since the action depends on switching currents which remain substantially constant in value, the crystal triodes may be operated under safe working conditions which are easily set by adjusting the circuit parameters.

Although it has been assumed for clearness that the crystal triodes 1A and 1B are of the kind requiring for operation as an amplifier a positive potential for the emitter electrode and a negative potential for the collector electrode, the opposite kind of crystal triode could be used, in which case a negative polarising source should be used.

The crystal triodes can be of the type in which the emitter and collector electrodes consist of sharply pointed wires or cat's whiskers, or in which the semiconductor crystal has several regions having respectively P- and N-type conductive characteristics, with what are called P–N junctions between alternate regions, all the electrodes consisting of metal coatings, or the like, arranged in contact with different regions of the crystal.

What I claim is:

1. An electric trigger circuit comprising a pair of similar crystal triodes each having an emitter electrode, a collector electrode and a base electrode, means for connecting both the collector electrodes to a point of fixed potential, a direct current source having one terminal connected to the said point, means for connecting the emitter electrode of each crystal triode to the base electrode of the other, two equal feed resistors connecting the emitter electrodes to the other terminal of the said source, the said feed resistors being of such magnitude as to provide equal and opposite emitter-base potentials for the said crystal triodes, respectively, of sufficient value to hold one crystal triode in the "on" condition and the other in the "off" condition, means for applying an input pulse to one emitter electrode to interchange the conditions of the two crystal triodes, and means for deriving an output signal from the circuit in response to the said input pulse.

2. A trigger circuit, according to claim 1, comprising means for connecting the base electrode of each crystal triode to an intermediate point of the feed resistor corresponding to the other crystal triode.

References Cited in the file of this patent

UNITED STATES PATENTS

| | | |
|---|---|---|
| 2,569,345 | Shea | Sept. 25, 1951 |
| 2,592,683 | Gray | Apr. 15, 1952 |
| 2,605,306 | Eberhard | July 29, 1952 |
| 2,620,400 | Snijders | Dec. 2, 1952 |
| 2,620,448 | Wallace | Dec. 2, 1952 |